United States Patent
Zhang et al.

(10) Patent No.: US 11,042,730 B2
(45) Date of Patent: Jun. 22, 2021

(54) METHOD, APPARATUS AND DEVICE FOR DETERMINING AN OBJECT, AND STORAGE MEDIUM FOR THE SAME

(71) Applicant: BAIDU ONLINE NETWORK TECHNOLOGY (BEIJING) CO., LTD., Beijing (CN)

(72) Inventors: Xiaoyin Zhang, Beijing (CN); Chen Zhao, Beijing (CN); Yajie Du, Beijing (CN); Zhongqin Wu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 85 days.

(21) Appl. No.: 16/516,039

(22) Filed: Jul. 18, 2019

(65) Prior Publication Data

US 2020/0042777 A1 Feb. 6, 2020

(30) Foreign Application Priority Data

Aug. 1, 2018 (CN) .......................... 201810866053.X

(51) Int. Cl.
*G06K 9/00* (2006.01)
*G06T 7/246* (2017.01)

(52) U.S. Cl.
CPC ..... *G06K 9/00342* (2013.01); *G06K 9/00369* (2013.01); *G06K 9/00744* (2013.01); *G06T 7/248* (2017.01)

(58) Field of Classification Search
CPC ........... G06K 9/00342; G06K 9/00744; G06K 9/00369; G06T 7/248; G06T 2207/10016;
(Continued)

(56) References Cited

U.S. PATENT DOCUMENTS

2015/0220776 A1* 8/2015 Cronholm .............. G06F 3/017
382/103
2017/0228587 A1 8/2017 Zhang et al.
(Continued)

FOREIGN PATENT DOCUMENTS

| CN | 102509338 A | 6/2012 |
| CN | 104680570 A | 6/2015 |
| CN | 107845129 A | 3/2018 |

OTHER PUBLICATIONS

Chinese Patent Application No. 201810866053.X First Office Action dated Dec. 24, 2020, 5 pages.
(Continued)

*Primary Examiner* — Dhaval V Patel
(74) *Attorney, Agent, or Firm* — Lathrop GPM LLP

(57) ABSTRACT

A method for determining an object comprises: determining a reference representation based on positions of a first reference point and a second reference point of a first object in a reference image, which indicates a distance and a relative direction between the first and second reference points in the reference image; determining a detection representation based on positions of the first and second reference points in a detection frame including the first object in a video, which indicates a distance and a relative direction between the first and second reference points in the detection frame; determining rotation parameters associated with a first predetermined point and a second predetermined point in a second object associated with the first object based on the reference representation and the detection representation; and adjusting a target representation between the first and second predetermined points in the second object based on the rotation parameter.

19 Claims, 5 Drawing Sheets

(58) Field of Classification Search
CPC .............. G06T 2207/30196; G06T 7/75; G06T 19/006; G06F 3/011; G06F 2203/012
See application file for complete search history.

(56) References Cited

U.S. PATENT DOCUMENTS

2018/0357472 A1* 12/2018 Dreessen ................. G06T 11/00
2019/0156564 A1* 5/2019 Tung ......................... G06T 7/50

OTHER PUBLICATIONS

Chinese Patent Application No. 201810866053.X English translation of First Office Action dated Dec. 24, 2020, 5 pages.

* cited by examiner

METHOD, APPARATUS AND DEVICE FOR DETERMINING AN OBJECT, AND STORAGE MEDIUM FOR THE SAME

CROSS REFERENCE TO RELATED APPLICATION

This application claims priority to Chinese Patent Application No. 201810866053.X, filed with the State Intellectual Property Office of P. R. China on Aug. 1, 2018, the entire contents of which are incorporated herein by reference.

FIELD OF THE INVENTION

Embodiments of the present disclosure generally relate to the field of computer science, and more particularly to a method, an apparatus and a device for determining an object, and a computer readable storage medium for the same.

RELATED ART

With development of computer technology, the number of applications that may be provided on mobile terminals, such as mobile phones and tablets, is growing rapidly. Particularly, various video applications and camera applications with special-effects have attracted much attention and become popular.

In such applications, there is a demand for tracking gestures and body movements of a user so as to increase interactivity and entertainments. However, most conventional video applications and camera special-effects applications detect discrete and special movements of the body with the mobile terminal, and provide a corresponding interaction feedback to the user when the detection is successful. It is not possible for conventional approaches to detect two-dimensional skeleton joints of the user in an image or in a video and to create a three-dimensional character model corresponding to the body movements of the user in real time. Therefore, it is useful to develop a method capable of creating a three-dimensional virtual model by following the body movements of the users in real time. It is also advantageous if such method does not require additional hardware for acquiring image or video.

SUMMARY OF THE INVENTION

According to exemplary embodiments of the present disclosure, a solution for determining an object is provided.

In a first aspect of embodiments of the present disclosure, a method for determining an object is provided. The method comprises determining a reference representation based on positions of a first reference point and a second reference point of a first object in a reference image, the reference representation indicating a distance and a relative direction between the first reference point and the second reference point in the reference image. The method further comprises determining a detection representation based on positions of the first reference point and the second reference point in a detection frame including the first object in a video, the detection representation indicating a distance and a relative direction between the first reference point and the second reference point in the detection frame. The method further comprises determining rotation parameters associated with a first predetermined point and a second predetermined point in a second object based on the reference representation and the detection representation, the second object being a three-dimensional object associated with the first object, the first predetermined point being corresponding to the first reference point, and the second predetermined point being corresponding to the second reference point. The method further comprises adjusting a target representation between the first predetermined point and the second predetermined point in the second object based on the rotation parameters.

In a second aspect of embodiments of the present disclosure, a device is provided, comprising: one or more processors, and a storage device, configured to store one or more programs, wherein, the one or more programs enable the one or more processors to implement the method according the first aspect of the present disclosure when being executed by the one or more processors.

In a third aspect of embodiments of the present disclosure, a computer readable storage medium having a computer program stored thereon is provided. The program implements the method according the first aspect of the present disclosure when being executed by a processor.

It should be understood that, descriptions in the Summary of the present disclosure are not intended to limit an essential or important feature in embodiments of the present disclosure, and are also not construed to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Figure 1:
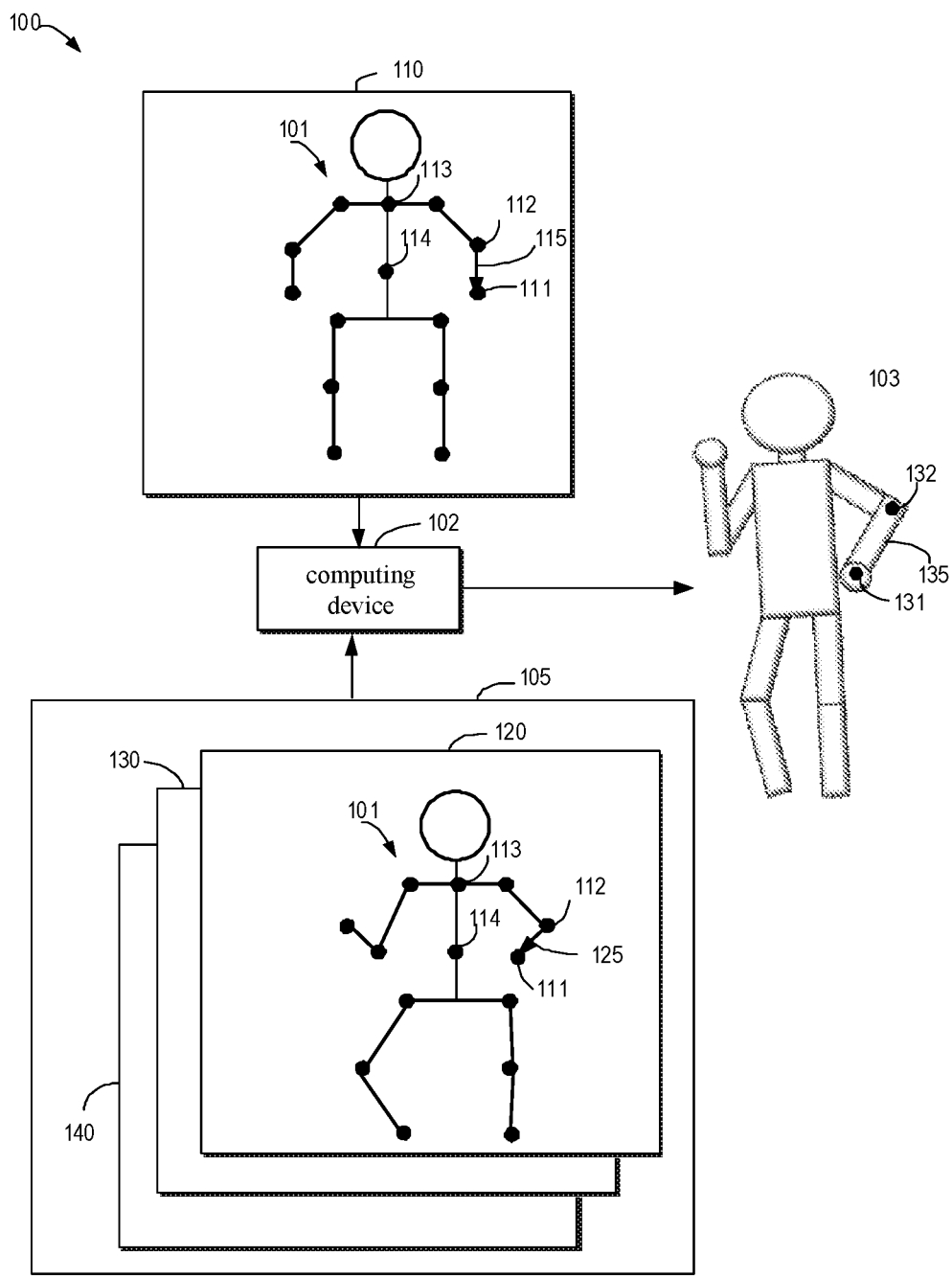
FIG. 1 is a schematic diagram illustrating an exemplary environment in which an embodiment of the present disclosure may be implemented.

Description will be made in more details below to embodiments of the present disclosure with reference to accompanying drawings. Some embodiments of the present disclosure are illustrated in the accompanying drawings. It should be understood that, the present disclosure may be implemented in various ways, but not be construed as a limitation of the embodiments described herein. On the contrary, those embodiments provided are merely for a thorough and complete understanding of the present disclosure. It should be understood that, the accompanying drawings and embodiments of the present disclosure are merely for exemplary purposes, and is not used to limit the protection scope of the present disclosure.

In the description of embodiments of the present disclosure, terms such as "include" and its equivalents should be understood as an inclusive meaning, i.e. "include but not limited to". Terms such as "based on" should be understood as "at least partially based on". Terms such as "an embodiment" or "the embodiment" should be understood as "at least one embodiment". Terms such as "first", "second" or the like may represent different or same objects. Other explicit and implicit definitions may also be included below.

As mentioned above, in applications such as video and camera special-effects, it is advantageous to track gestures and body movements of a user to increase interactivity and entertainments. In one embodiment, the present disclosure provides a method capable of creating a three-dimensional model following body gestures in real time according to two-dimensional body joints in a video.

Conventionally, creation of a three-dimensional model according to detection of two-dimensional body joints requires a camera capable of capturing depth information of the body. With such a camera, position information of a body of an object in an image in a depth direction (here, referring to a direction of a line for connecting the camera with the object in the description) may be obtained, for determining body movements of the object in the depth direction and creating or recreating a corresponding three-dimensional model. Such a scheme has special requirements for the camera in a user terminal, which is not easy to be widely applied. In addition, such a scheme requires complicated algorithms and a large amount of calculations, which is not plausible for following the body movements in real time.

According to embodiments of the present disclosure, a solution for determining an object is provided, for determining a three-dimensional object associated with an object in a video, such that the three-dimensional object may imitate, follow or otherwise reflect movements or gestures of the object in the video. In this solution, first, information about at least two reference points of an object in a reference image and in a video frame is determined. Then, adjustment to be executed on a three-dimensional object is determined based on the information. On this basis, the three-dimensional object may be adjusted to reflect the movements or gestures of the object in a corresponding frame. In this way, the adjusted three-dimensional object may reflect the movements or gestures of the object in the frames of the video correspondingly. Further, there are no additional requirements for the camera capturing the video. For example, it is not necessary to provide the camera with depth information. Therefore, the solution in the present disclosure may advantageously adjust a three-dimensional object associated with an object according to movements or gestures of the object in a video, to increase entertainments and interactivity with the user.

Embodiments of the present disclosure will be described in detail below with reference to accompanying drawings.

FIG. 1 is a schematic diagram illustrating an exemplary environment 100 in which an embodiment of the present disclosure may be implemented. In the exemplary environment 100, information about an object 101 in a reference image 110 and in a detection frame 120 is utilized by a computing device 102 to determine another object 103 associated with an object 101. Here, for ease of description, the object 101 is referred as a first object 101, and the object 103 is referred as a second object 103. The first object 101 may be an object in a video 105 with a change in the body or in the gesture, such as, a human, an animal, a toy or the like. In some cases, the first object 101 may be a user of the computing device 102. The second object 103 may be a virtual object created or determined by the computing device 102, for simulating or reflecting the change in the body or in the gesture of the first object 101, such as a three-dimensional virtual model.

It should be understood that, the environment illustrated in FIG. 1 is only illustrative, and the second object 103 may be determined by using a plurality of computing devices. It should also be understood that, the computing device 102 may be a fixed computing device, or may be a portable computing device, such as a mobile phone, a tablet or the like.

The reference image 110 may include the first object 101. Although the first object 101 is illustrated as a human body in FIG. 1, it should be understood that, the first object 101 may be any objects capable of conducting body movements, such as an animal and a toy. The first object 101 may make a predetermined gesture in the reference image 110, such as in a stand state illustrated in FIG. 1, or in a straight-sitting state or a side-lying state.

The computing device 102 may recognize the first object 101 in the reference image 110, and detect a plurality of reference points of the first object 101, such as reference points 111-114. The reference points may indicate skeleton joints of the first object 101. For example, in FIG. 1, the reference point 111 indicates a left wrist joint of the first object 101; the reference point 112 indicates a left elbow joint of the first object 101; the reference point 113 indicates a cervical joint of the first object 101; and the reference point 114 indicates a lumbar joint of the first object 111.

The computing device 102 may also determine a representation associated with any two of the reference points. For example, FIG. 1 illustrates a representation associated with the first reference point 111 and the second reference point 112, which is also referred as a reference representation 115. The reference representation 115 may include any indications of a distance and a relative direction between the first reference point 111 and the second reference point 112. For example, the reference representation 115 may be a geometric representation such as a vector, or may directly include data relating to the distance and the relative direction.

It should be understood that, for different types of first objects 101, the computing device 102 may detect different types of skeleton joints. Detection for the skeleton joints by the computing device 102 may be implemented in a deep-learning manner. It should also be understood that, although FIG. 1 illustrates 14 reference points, it is merely illustrative, and is not intent to limit the present disclosure. The first object 101 may have more and fewer joints.

The video 105 may be captured by a camera (not illustrated) in the computing device 102, or may be received by the computing device 102 from other devices, such as from another computing device or from a dedicated camera. The video 105 may include a plurality of frames, such as frames 120, 130 and 140. The first object 101 is included in at least some of the frames 120, 130 and 140. The body movements or gestures of the first object 101 may change in the video 105.

The computing device 102 may process the frame including the first object 101 in the video 105. Here, for ease of discussion, the frame to be processed by the computing device 102 is referred as a detection frame, such as a detection frame 120 illustrated in FIG. 1. The computing device 102 may recognize the first object 101 in the detection frame 120. Then, the computing device 102 may determine positions of the reference points (such as, reference points 111-114) in the detection frame 120. For example, when the first object 101 is a human body, the computing device 102 may determine the reference points (which are generally the skeleton joints of the human body in this case) by utilizing a method for detecting skeleton joints that is known in the art or will be developed in the future.

The computing device 102 may also determine a representation associated with the first reference point 111 and the second reference point 112 in the detection frame 120 (for ease of discussion, referred as a detection representation 125 below). As mentioned above with regard to the reference representation 115, the detection representation 125 may include any indications of the distance and the relative direction between the first reference point 111 and the second reference point 112. For example, the detection representation 125 may be a geometric representation such as a vector, or may directly include data relating to the distance and the relative direction.

It should be understood that, FIG. 1 illustrates three frames 120, 130 and 140, but it is merely illustrative, and is not intent to limit the present disclosure. The video 105 may include more or fewer frames.

The computing device 102 may determine a three-dimensional virtual object associated with the first object 101 (here, referred as the second object 103) according to an embodiment of the present disclosure. The second object 103 may imitate the body movements or the gestures of the first object 101, or may reflect the body movement or gestures of the first object 101 in the detection frame 120 in other ways.

In some embodiments, the second object 103 may make movements opposite to those movements made by the first object 101 in the detection frame 120. For example, if the computing device 102 determines that the first object 101 is in a squat state in the detection frame 120, the second object 103 may be in a standing state. In some embodiments, the second object may make movements mirroring those movements of the first object 101 in the detection frame 120. For example, when the computing device 102 determines that the first object 101 raises its left hand in the detection frame 120, the second object 103 may raise its right hand.

In order to determine body movements of the second object 103 according to the body movements of the first object 101 in the detection frame 120, a predetermined point corresponding to the reference point may be provided in the second object 103. As illustrated in FIG. 1, a first predetermined point 131 and a second predetermined 132 correspond to the first reference point 111 and the second reference 112, respectively. A target representation 135 associated with the first predetermined point 131 and the second predetermined 132 may also be provided.

It should be understood that, although FIG. 1 illustrates only two predetermined points, the second object 103 may include other predetermined points. In addition, the number of the predetermined points may be lower than or equal to the number of the reference points. In a case where the number of the predetermined points is lower than the number of the reference points, the second object 103 may only imitate or reflect the movements or gestures of a part of the body (such as, a left side of the body) of the first object 101. It should also be understood that, the type of the first object 101 may be different from the type of the second object 103, and embodiments of the present disclosure are not limited thereto. For example, the first object 101 may be a human body, while the second object 103 may be an animal.

The computing device 102 may adjust the body movement or gestures of the second object 103 correspondingly with respect to each frame including the first object 101 in the video 105, such that the second object 103 may imitate or reflect a changing process of the body movements of the first object 101 in the video 105.

Figure 2:
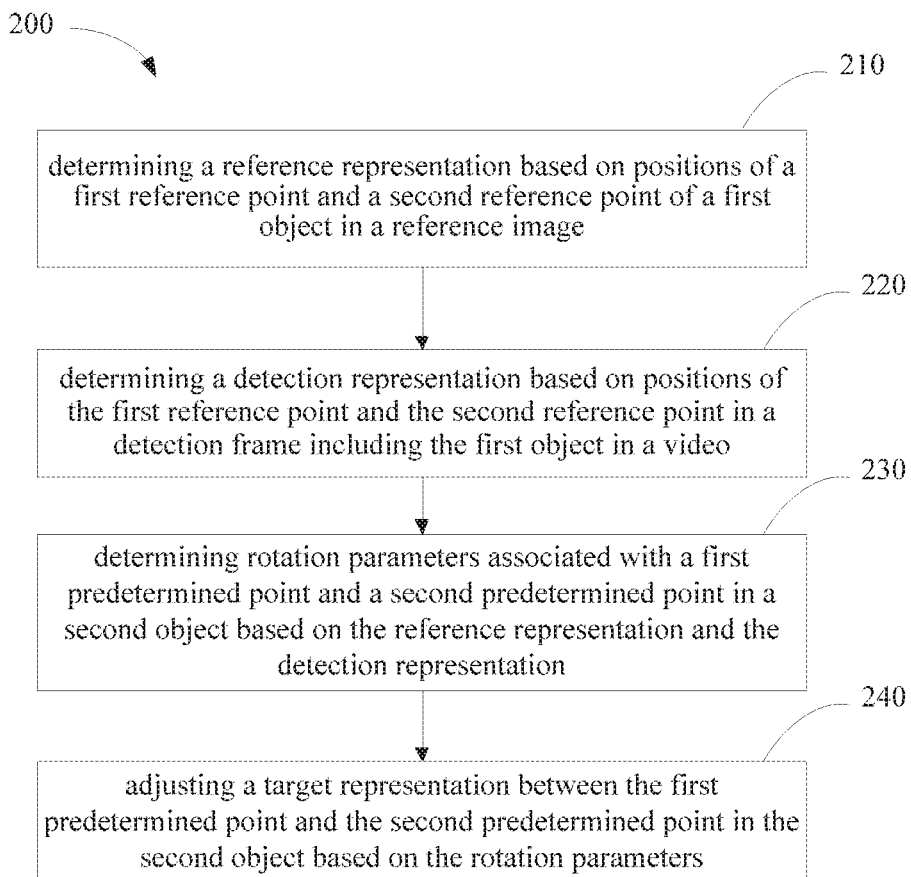
FIG. 2 is a flow chart illustrating a process for determining an object according to an embodiment of the present disclosure.

For understanding the solution for determining an object provided in the embodiments of the present disclosure more definitely, embodiments of the present disclosure will be further described with reference to FIG. 2. FIG. 2 is a flow chart illustrating a process 200 for determining an object according to an embodiment of the present disclosure. The process 200 may be implemented by the computing device 102 in FIG. 1. For ease of discussion, the process 200 will be described in combination with FIG. 1.

At block 210, the computing device 102 determines a reference representation 115 based on positions of a first reference point 111 and a second reference point 112 of a first object 101 in a reference image 110. The reference representation 115 indicates a distance and a relative direction between the first reference point 111 and the second reference point 112 in the reference image 110.

In some embodiments, the reference image 110 may be obtained before capturing the video 105. The first object 101 in the reference image 110 may perform a predetermined behavior. Performing the predetermined behavior may include making a predetermined movement, such as raising both hands, or may include making a predetermined gesture, such as the standing gesture illustrated in FIG. 1. In some embodiments, the reference image 110 may be a frame in the video 105, such as a first frame in which the first object 101 appears, and may be a frame prior to the detection frame 120. In an embodiment in which the computing device 102 processes the video in real time, the detection frame 120 may be a first frame from which the whole first object 101 is completely recognized by the computing device 102.

In some embodiments, the reference representation 115 may be a vector formed by the first reference point 111 and the second reference 112 in the reference image 110 illustrated in FIG. 1. In some embodiments, the reference representation 115 may include any indications of the distance and the relative direction between the first reference point 111 and the second reference point 112 in the reference image 110. For example, the reference representation 115 may directly include data relating to the distance and the relative direction between the first reference point 111 and the second reference point 112 in the reference image 110.

In some embodiments, the computing device 102 may determine the distance and the relative direction between the first reference point 111 and the second reference point 112 in the reference image 110 based on the positions of the first reference point 111 and the second reference 112 in the reference image 110, as the reference representation. The positions of the first reference point 111 and the second reference 112 in the reference image 110 may be represented by pixels where the reference points are located, or may be represented by coordinates of the reference points in a plane of the reference image 110.

At block 220, the computing device 102 determines a detection representation 125 based on the positions of the first reference point 111 and the second reference 112 in the detection frame 120. The detection representation 125 indicates the distance and the relative direction between the first reference point 111 and the second reference point 112 in the detection frame 120. The detection frame 120 may be selected from frames including the first object 101 in the video 105, or the detection frame 120 may be any frame including the first object 101 of the video 105.

As mentioned above with reference to the reference representation 115, in some embodiments, the detection representation 125 may be a vector formed by the first reference point 111 and the second reference 112 in the detection frame 120 as illustrated in FIG. 1. In some embodiments, the detection frame 125 may include any indications of the distance and the relative direction between the first reference point 111 and the second reference point 112 in the detection frame 120. For example, the detection representation 125 may directly include data relating to the distance and the relative direction between the first reference point 111 and the second reference point 112 in the reference image 110.

In some embodiments, the computing device 102 may first select a frame including the first object 101 from the video 105 as the detection frame 120. The computing device 102 may select the detection frame 120 from the video 105 based on a predefined rule. When the computing device 102 adjusts the second object 103 in real time while obtaining the video 105, the computing device 102 may use each frame including the first object 101 as the detection frame 120 sequentially.

After obtaining the detection frame 120, the computing device 102 may detect the position of the reference point of the first object 101 in the detection frame 120. For example, the positions of the first reference point 111 and the second reference point 112 in the detection frame 120 may be detected. Then, the computing device 102 may determine the distance and the relative direction between the first reference point 111 and the second reference 112 based on the detected positions, as the detection representation. As mentioned above with regard to the reference representation 115, the positions of the first reference point 111 and the second reference point 112 in the detection frame 120 may be represented by the pixel values of the reference points in the detection frame 120, or may be represented by the coordinates of the reference points in the plane of the detection frame 120.

At block 230, the computing device 102 determines rotation parameters associated with the first predetermined point 131 and the second predetermined point 132 in the second object 103 based on the reference representation 115 and the detection representation 125. As described above with regard to FIG. 1, the second object 103 is a three-dimensional object associated with the first object 101. Specifically, the second object 103 may be used to imitate or reflect the body movements or gestures of the first object 101. The first predetermined point 131 corresponds to the first reference point 111, and the second predetermined point 132 corresponds to the second reference points 112.

The rotation parameters may include rotating angles with respect to different predefined directions and predefined planes. For example, a longitudinal axis of the first object 101 may be used as the predefined direction, but other directions in the detection frame 120 (such as, a direction parallel to or perpendicular to a direction of a bottom edge of the detection frame 120) may alternatively be used as the predefined direction. An image plane associated with the detection frame 120 may be used as the predefined plane, but a plane perpendicular to the image plane may alternatively be used as the predefined plane. In this application, the image plane associated with the detection frame 120 refers to a plane in which an image is generated when the detection frame 120 is formed or captured, which has been known in the imaging field. For different predefined directions and planes, respective rules may be provided for determining the rotation parameters based on the reference representation 115 and the detection representation 125.

Figure 4:
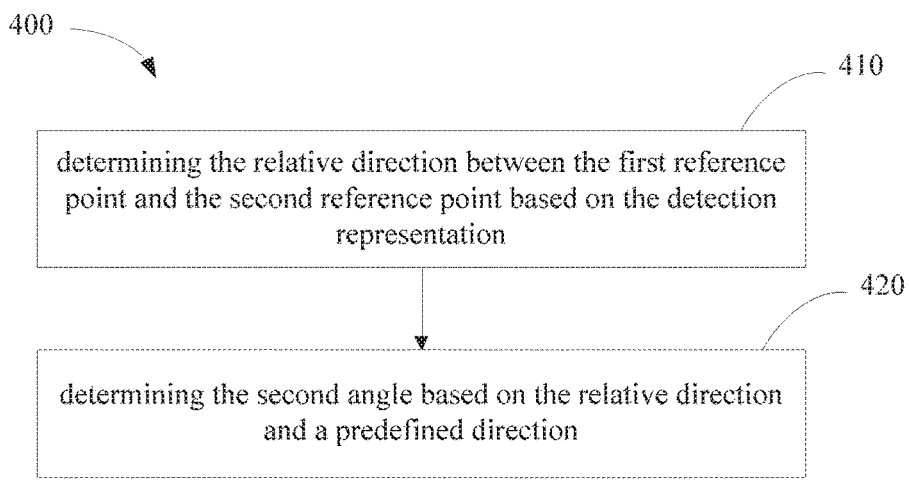
FIG. 4 is a flow chart illustrating a process for determining a second angle according to some embodiments of the present disclosure.
Figure 5:
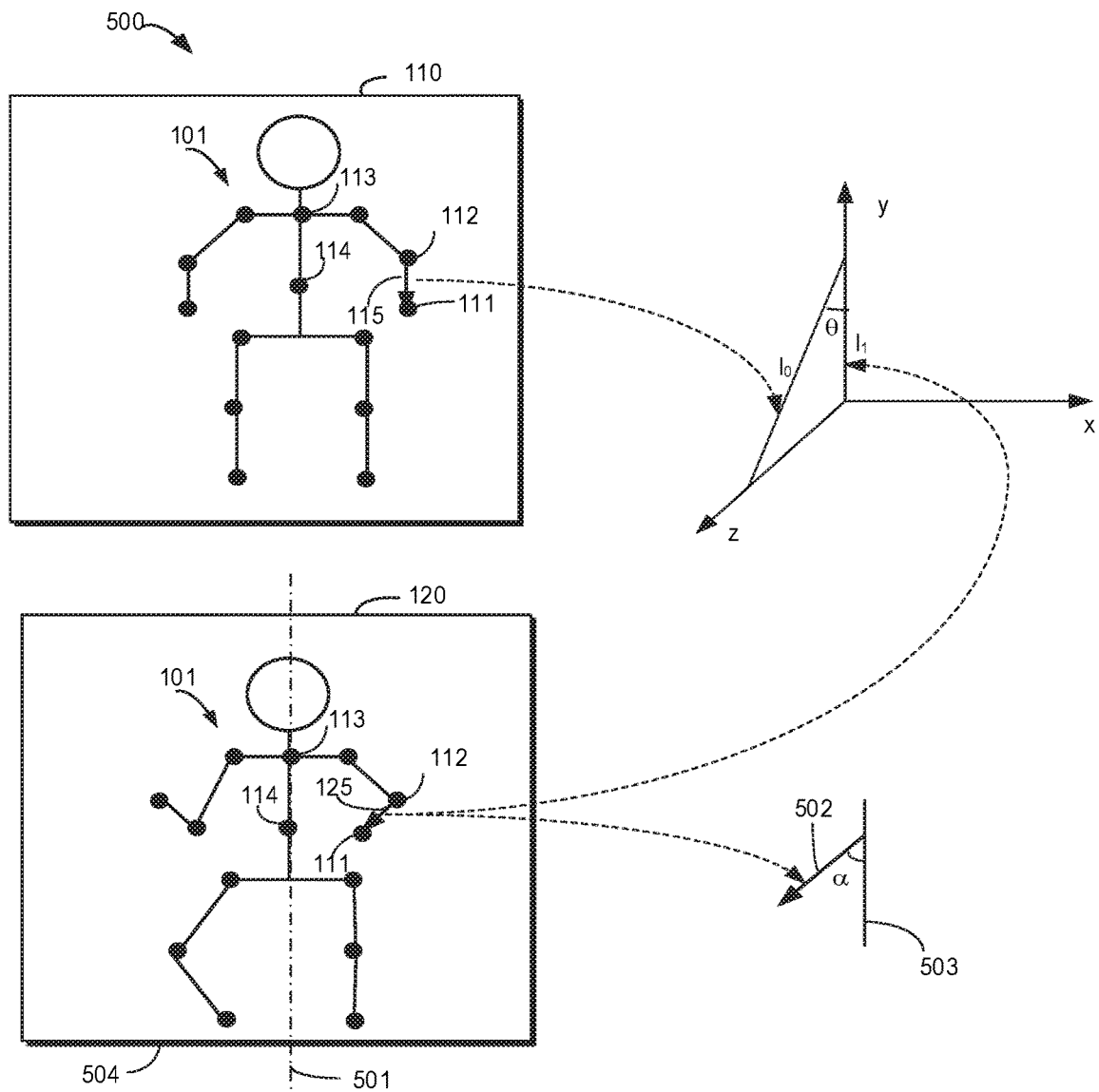
FIG. 5 is a schematic diagram illustrating a determination of the first angle and the second angel according to some embodiments of the present disclosure.

In some embodiments, the computing device 102 may determine a first angle $\theta$ and a second angle $\alpha$ (as illustrated in FIG. 5, with reference to the description below) based on the reference representation 115, the detection representation 125 and the predefined direction. The first angle $\theta$ may indicate an angle between a line for connecting the first reference point 111 with the second reference point 112 and an image plane. The image plane is associated with the detection frame 120. In other words, when the image of the detection frame 120 is formed or captured, the angle between a line for connecting the first reference point 111 of the first object 101 with the second reference point 112 of the first object 101 in an actual space and the image plane is indicated by the first angle $\theta$. The second angle $\alpha$ may indicate an angle between a projection of the line for connecting the first reference point 111 of the first object 101 with the second reference point 112 in the actual space on the image plane and the predefined direction (for example, a direction perpendicular to a bottom side of the detection frame 120). A processing of determining the first angle $\theta$ and the second angle $\alpha$ will be described in detail below with reference to FIG. 3, FIG. 4, and FIG. 5.

At block 240, the computing device 102 adjusts the target representation 135 between the first predetermined point 131 and the second predetermined point 132 in the second object 103 based on the rotation parameters determined at block 203. The target representation 135 may be in a plurality of forms. For example, the target representation 135 may be a vector in the coordinate system of the object 103, or may be a rigid body between the first determined point 131 and the second predefined point 132 (such as, bones in a skeletal animation). The target representation 135 may be adjusted by employing different methods depending on different ways for creating the second object 103.

In some embodiments, the second object 103 may be created by using a technology such as the skeletal animation. In this case, the target representation 135 may be the rigid body between the first predetermined point 131 and the second predetermined point 132, and may be rotated with the second predetermined point 132 as a fulcrum.

In such embodiments, rigid representations (such as, bones) between different pairs of predetermined points of the second object 103 may be predefined. Therefore, the computing device 102 may first determine the target representation 135 between the first predetermined point 131 and the second predetermined point 132 from those rigid representations. Then, the computing device 102 may obtain the first angle $\theta$ and the second angle $\alpha$ from the determined rotation parameters, and adjust the target representation 135 by utilizing the first angle $\theta$ and the second angle $\alpha$. For example, the first angle $\theta$ and the second angle $\alpha$ may be taken as input parameters of a skeletal animation model. It should be understood that, the first angle $\theta$ and the second angle $\alpha$ described here refer to the same angles as those described above with regard to block 230.

Specifically, the computing device 102 may transform the first angle θ and the second angle α to a rotation matrix for rotating the target representation 135, and then rotate the target representation 135 with the second predetermined point 132 as the fulcrum, such that an orientation of the target representation 135 in the second object 103 may imitate or reflect relative orientations of the first reference point 111 and the second reference point 112 in the detection frame 120. As illustrated in FIG. 1, the first object 101 makes a gesture in which its left elbow towards the back in the detection frame 120, while the left elbow of the second object 103 makes a similar gesture.

It should be understood that, the gestures illustrated in FIG. 1 is merely illustrative, which is not intent to limit the present disclosure. In embodiments of the present disclosure, different transformation relationships may be predetermined for transform rotation parameters to the rotation matrix used in the skeletal animation, depending on whether the second object 103 imitates or mirrors the body movements of the first object 101. The second object 103 may be manipulated or driven with the first angle θ and the second angle α by utilizing any methods in the field of skeletal animation which has been known or will be developed in the future, details of which are omitted here.

In some embodiments, the above blocks 220-224 may be performed for each frame including the first object 101 in the video 105, such that changes of the body movements of the second object 103 may imitate or reflect changes of the body movements of the first object 101 during the video 101 is photographed. In some embodiments, the created second object 103 may be stored in association with corresponding frames. In some embodiments, the created second object 103 may be presented in association with corresponding frames, such as, on a display of the computing device 102 or other devices in real time.

The processing 200 of determining an object according to an embodiment of the present disclosure has been described above with reference to FIGS. 1 and 2. In this way, a three-dimensional model object associated with the object in the video may be created. The model object may imitate or otherwise reflect the body movements or gestures of the object in corresponding frames. Further, according to embodiments of the present disclosure, the three-dimensional model object may be created without depth information. Therefore, there are no additional requirements for the camera capturing the video. When embodiments of the present disclosure are applied to a mobile terminal, a three-dimensional virtual model associated with the object may be created in real time, thereby increasing interactivity with the user and improving entertainments.

Figure 3:
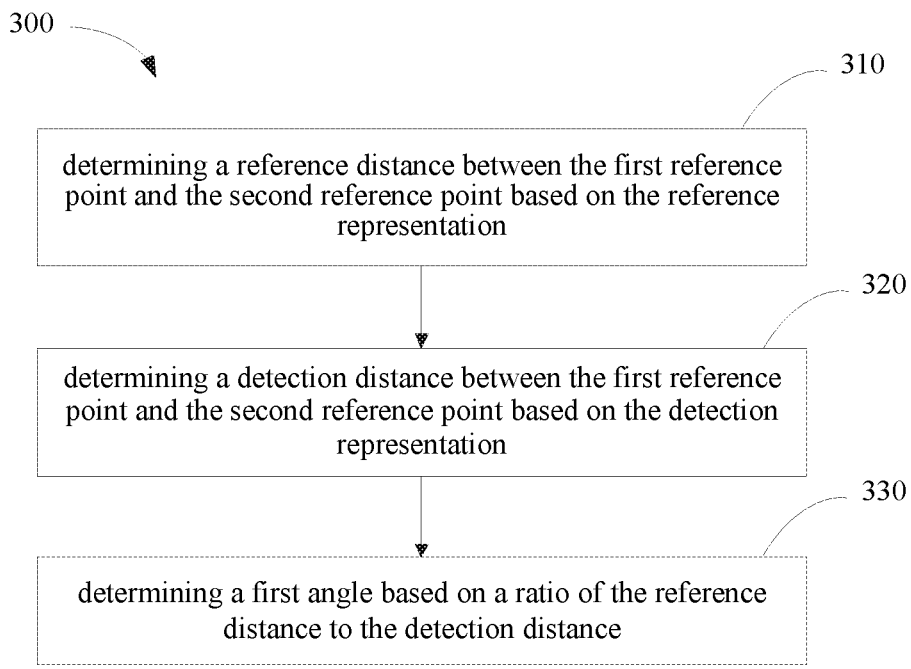
FIG. 3 is a flow chart illustrating a process for determining a first angle according to some embodiments of the present disclosure.

As mentioned above with reference to FIG. 2, the computing device 102 may determine the first angle θ and the second angle α base on the reference representation 115 and the detection representation 125. A process for determining the first angle θ will be described below with reference to FIG. 3 and FIG. 5. A process for determining the second angle α will be described below with reference to FIG. 4 and FIG. 5. FIG. 3 is a flow chart illustrating the process 300 for determining the first angle θ according to some embodiments of the present disclosure. FIG. 4 is a flow chart illustrating the process 400 for determining the second angle α according to some embodiments of the present disclosure. FIG. 5 is a schematic diagram 500 illustrating the determination of the first angle θ and the second angle α according to some embodiments of the present disclosure.

Referring to FIG. 3, at block 310, the computing device 102 may determine a reference distance $l_0$ between the first reference point 111 and the second reference point 112 based on the reference representation 115 (referring to FIG. 5). The reference distance $l_0$ indicates a distance between the first reference point 111 and the second reference point 112 in the reference image 110. In a case where the reference representation 115 is a vector, the reference distance $l_0$ may be the module of the vector. In other cases, the reference distance $l_0$ may be calculated according to pixels or coordinates where the first reference point 111 and the second reference point 112 locate. In some embodiments, the first object 101 may be in a normal predefined gesture in the reference image 110. In this case, the reference distance l0 may be considered as the actual length of the body of the first object 101 (such as, the left forearm illustrated in FIG. 1) associated with the first reference point 111 and the second reference point 112.

At block 320, the computing device 102 may determine a detection distance $l_1$ between the first reference point 111 and the second reference point 112 based on the detection representation 125 (referring to FIG. 5 again). The reference distance $l_1$ indicates a distance between the first reference point 111 and the second reference point 112 in the detection frame 120. The detection distance $l_1$ may be determined as described above with reference to block 310.

Now referring to FIG. 5, the x-y plane may be the image plane mentioned above or a plane parallel to the image plane. The detection distance $l_1$ may be considered as a length of a projection of the left forearm of the first subject 101, which has an actual length equal to the reference distance $l_0$ when the detection frame 120 is formed or captured, in the image plane. As can be seen, the following equation (1) may be satisfied.

$$\theta = \arccos\left(\frac{l_1}{l_0}\right) \quad (1)$$

Referring back to FIG. 3, at block 330, the computing device 102 may determine the first angle θ based on a ratio of the reference distance $l_0$ to the detection distance $l_1$. Specifically, the computing device 102 may calculate the first angle θ based on specific values of the reference distance $l_0$ and the detection distance $l_1$ according to the equation (1). It should be noted that, the equation (1) is merely illustrative, which is not intent to limit the present disclosure. Respective calculation rules may be predetermined depending on difference predefined directions and different predefined planes, but embodiments of the present disclosure are not limited thereto.

In some embodiments, it is necessary to further take into consideration forward and backward movements of the first object 101 with respect to the camera during the photographing of the video 105. Therefore, an appropriately correction needs to be made to the detection distance l1. For example, specific reference points of the first object 101 may be selected as references, between which the forward and backward movements with respect to the camera are not readily to occur. For example, the third reference 113 and the fourth reference 114 illustrated in FIG. 1 may be selected as the references.

In this case, the computing device 102 may determine a predetermined distance between the third reference point 113 and the fourth reference point 114 in the reference image 110, and an updated distance in the detection frame 120. Then, the detection distance $l_1$ may be modified based on a ratio of the predetermined distance to the updated distance.

In such embodiments, the body movements of the first object 102 may be imitated or reflected more accurately.

Referring to FIG. 4, FIG. 4 is a flow chart illustrating the process 400 for determining the second angle α according to some embodiments of the present disclosure. At block 410, the computing device 102 may determine the relative direction between the first reference point 111 and the second reference point 112 based on the detection representation 125.

Referring to FIG. 5, the computing device 102 may determine the relative direction 502 between the first reference point 111 and the second reference point 112 in the detection frame 120. In a case where the detection representation 125 is a vector, the computing device 102 may take the direction of the vector as the relative direction 502. In a case where the detection representation 125 includes pixel values or coordinates of the first reference point 111 and the second reference point 112 in the detection frame 120, the relative direction 502 may be determined based on the pixel values or the coordinates. As mentioned above, a predefined direction may be defined. As illustrated in FIG. 5, the predefined direction 503 is perpendicular to the bottom side 504 of the detection frame 120.

Referring to FIG. 4, at block 420, the computing device 102 may determine the second angle ca based on the relative direction 502 and the predefined direction 503. For example, in a case where the detection representation 125 is a vector, the computing device 102 may calculate a degree of an angle between the vector and the predefined direction 503 as the value of the second angle α. It should be understood that, although FIG. 5 illustrates that the predefined direction is a direction perpendicular to the bottom side 504 of the detection frame 120, it is merely illustrative, and is not intent to limit the present disclosure. Different directions may be selected as the predefined direction. For example, a direction parallel to the bottom side 504 may be selected as the predefined direction. In some embodiments, the longitudinal axis 501 of the first object 101 may be selected as the predefined direction.

It should be understood that, the process for determining the rotation parameters described above with reference to FIG. 5 is merely illustrative. According to embodiments of the present disclosure, similar methods may also be applied for determining rotation parameters for other predetermined points of the second object 103.

In such embodiments, the rotation parameter for manipulating or driving the three-dimensional object may be determined simply and quickly without additional depth information. In this way, such embodiments may be applied to various application widely without limited to performances of a camera for capturing a video.

As mentioned above, embodiments of the present disclosure are particularly suitable for applications of mobile terminals such as a mobile phone, or a tablet. In those applications, the method according to embodiments of the present disclosure may be combined with augmented reality (AR) technology, to provide a user with novel AR interactions based on body movements. For example, when a camera of a mobile device recognizes the body of a user, it starts to detect skeleton joints in real time, and renders a virtual three-dimensional model near the body of the user based on information about the skeleton joints by utilizing the method according to the present disclosure. Movements of the user may be mapped to the virtual model in real time, thereby implementing inventive interactions with the virtual model based on the skeleton joints of the body.

Figure 6:
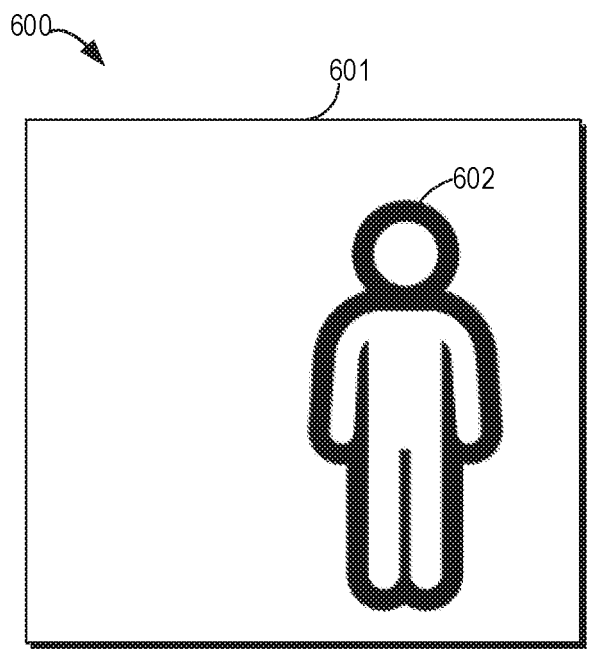
FIG. 6 is a schematic diagram illustrating providing of guiding information according to some embodiments of the present disclosure.

In some embodiments, guiding information may be provided. The guiding information is used for guiding the first object 101 (generally the user of the mobile device in this case) to perform a predefined behavior. FIG. 6 is a schematic diagram 600 illustrating providing of guiding information according to some embodiments of the present disclosure. In the example of FIG. 6, a display 601 of the mobile device displays guiding information 602, which is a human-shaped frame with both hands hanging naturally. The guiding information 602 may guide the first object 101 (such as, the user of the mobile device) to perform the predefined behavior, for example, to make the gesture indicated by the guiding information 602 in the field of view of the camera.

Then, it may be determined whether the first object 101 appearing in the field of view of the camera performs the predefined behavior, for example, whether makes the gesture as indicated by the guidance information 602. If the first object 101 performs the predefined behavior, an image including the first object 101 may be acquired as the reference image 110 described above. However, if the first object 101 does not perform the predefined behavior, further guiding information may be provided to cause the first object to adjust until it performs the predefined behavior.

Specifically, when the first object 101 appears in the field of view of the camera, and is then adjusted to match the guiding information 602 by adjusting a distance and an angle between the first object 101 and the camera, it is determined that the object is recognized successfully. In this case, the computing device 102 may determine that the first object 101 has performed the predefined behavior, and take the obtained image as the reference image 101.

In such embodiments, the detected skeleton joints may be displayed in real time while the first object 101 enters the field of view of the camera. When the whole first object 101 enters the field of view of the camera completely, and performs the predefined behavior according to the guiding information (such as, making a gesture as guided according to the guiding information 602), the reference image 101 is obtained, following by subsequent interactions. It should be understood that, although FIG. 6 illustrates the guiding information as the human-shaped frame, the guiding information may be presented in various forms. For example, the guiding information may be characters or voice. In addition, the guiding information may vary depending on different predefined behaviors.

Next, the first object 101 performs a series of body movements or changes its gestures. The reference points (that is, the skeleton joints) of the first object 101 in the frame of the video 105 are detected in real time. Then, the body movement or gestures of the three-dimensional virtual model (i.e., the second object 103) is adjusted in real time by utilizing the processes described above with reference with FIG. 2, FIG. 3 and FIG. 4, i.e., mapping the information about the skeleton joint of the first object 101 to the three-dimensional virtual model synchronously, achieving the effects that the three-dimensional virtual model follows the movements of the first object in real time.

Figure 7:
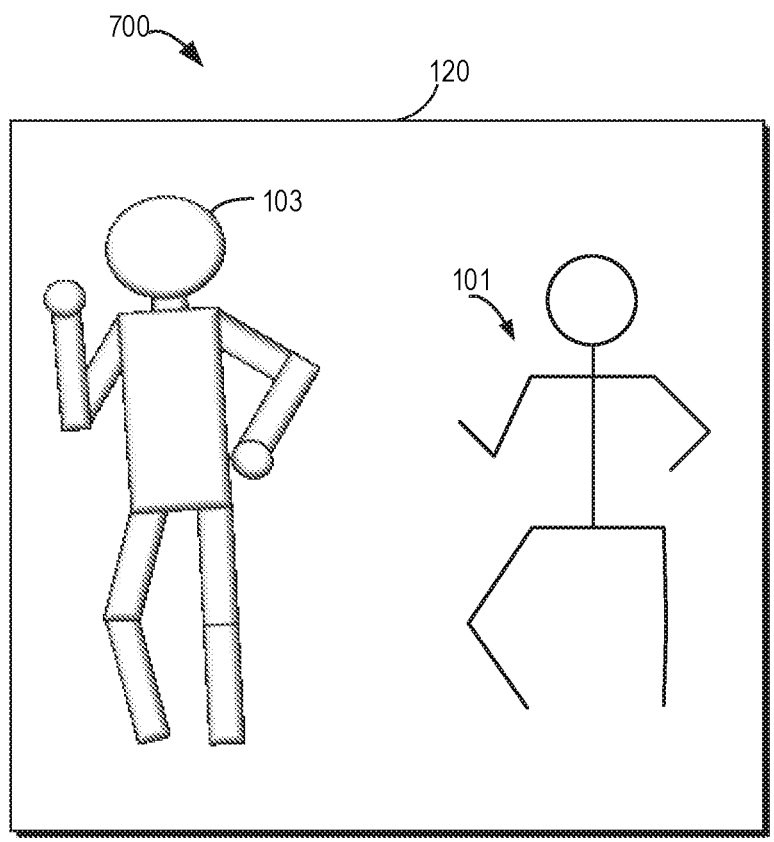
FIG. 7 is a schematic diagram illustrating interacting effects according to some embodiments of the present disclosure.

In some embodiments, the second object 103 may be presented in association with the detection frame 120 in the video 105. FIG. 7 is a schematic diagram 700 illustrating interacting effects according to some embodiments of the present disclosure. As illustrated in FIG. 7, the created second object 103 may be presented in association with the detection frame 120 (including the first object 101 therein), for example, on a display in the computing device 102 or other device, or on a dedicated display device. In the example of FIG. 7, the created second object 103 presents body movements similar to those of the first object 101. In some embodiments, the second object 103 may be presented through an AR device (such as, a pair of AR glasses).

The second object 103 may be adjusted in real time corresponding to each frame while the video 105 is acquired, and be presented in real time. It should be understood that, in such embodiments, the computing device 102 may be a mobile device capturing the video 105, or may be a device different from the mobile device capturing the video 105.

In such embodiments, the three-dimensional virtual model may be presented to the user in real time while the user photographs the video. In this way, the interactivity with the user and entertainments may be enhanced, thereby improving the user's experiences.

Figure 8:
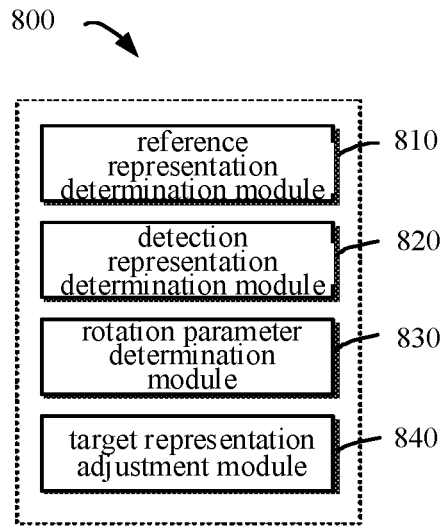
FIG. 8 is a schematic diagram illustrating an apparatus for determining an object according to embodiments of the present disclosure.

FIG. 8 is a schematic diagram illustrating an apparatus 800 for determining an object according to embodiments of the present disclosure. The apparatus 800 may be included in the computing device 102 illustrated in FIG. 1 or be implemented as the computing device 102. As illustrated in FIG. 8, the apparatus 800 comprises a reference representation determination module 810, configured to determine a reference representation based on positions of a first reference point and a second reference point of a first object in a reference image. The reference representation indicates a distance and a relative direction between the first reference point and the second reference point in the reference image. The apparatus 800 further comprises a detection representation determination module 820, configured to determine a detection representation based on positions of the first reference point and the second reference point in a detection frame including the first object in the video. The detection representation indicates a distance and a relative direction between the first reference point and the second reference point in the detection frame. The apparatus 800 further comprises a rotation parameter determination module 830, configured to determine rotation parameters associated with a first predetermined point and a second predetermined point in a second object based on the reference representation and the detection representation. The second object is a three-dimensional object associated with the first object. The first predetermined point corresponds to the first reference point. The second predetermined point corresponds to the second reference point. The apparatus 800 further comprises a target representation adjustment module 840, configured to adjust a target representation between the first predetermined point and the second predetermined point in the second object based on the rotation parameters.

In some embodiments, the reference representation determination module 810 comprises: a first distance and direction determination module, configured to determine the distance and the relative direction between the first reference point and the second reference point in the reference image based on the positions of the first reference point and the second reference point in the reference image, as the reference representation.

In some embodiments, the detection representation determination module 820 comprises: a frame selection module and a second distance and direction determination module. The frame selection module is configured to select a frame including the first object in the video as the detection representation. The second distance and direction determination module is configured to determine the distance and the relative direction between the first reference point and the second reference point in the detection frame based on the positions of the first reference point and the second reference point in the detection frame, as the detection representation.

In some embodiments, the rotation parameter determination module 830 comprises: an angle determination module, configured to determine a first angle and a second angle based on the reference representation, the detection representation and a predefined direction. The first angle indicates an angle between a line for connecting the first reference point with the second reference point and an image plane associated with the detection frame. The second angle indicates an angle between a projection of the connecting line on the image plane and the predefined direction.

In some embodiments, the angle determination module comprises: a reference distance determination module, a detection distance determination module and a first angle determination module. The reference distance determination module is configured to determine a reference distance between the first reference point and the second reference point based on the reference representation. The detection distance determination module is configured to determine a detection distance between the first reference point and the second reference point based on the detection representation. The first angle determination module is configured to determine the first angle based on a ratio of the reference distance to the detection distance.

In some embodiments, the angle determination module comprises: a relative direction determination module and a second angle determination module. The relative direction determination module is configured to determine the relative direction between the first reference point and the second reference point based on the detection representation. The second angle determination module is configured to determine the second angle based on the relative direction and the predefined direction.

In some embodiments, the target representation adjustment module 840 comprises: a target representation determination module, an angle obtaining module and an angle utilizing module. The target representation determination module is configured to determine the target representation between the first predefined point and the second predetermined point. The target representation indicates a distance and a relative direction between the first predefined point and the second predefined point. The angle obtaining module is configured to obtain a first angle and a second angle based on the rotation parameters. The first angle indicates an angle between a line for connection the first reference point with the second reference point and an image plane associated with the detection frame. The second angle indicates an angle between a projection of the connecting line on the image plane and a predefined direction. The angle utilizing module is configured to adjust the target representation by utilizing the first angle and the second angle.

In some embodiments, the apparatus 800 further comprises: a guiding information providing module and a reference image obtaining module. The guiding information providing module is configured to provide guiding information to the first object for guiding the first object to perform a predefined behavior. The reference image obtaining module is configured to obtain an image including the first object as the reference image in responding to the first object performing the predefined behavior.

In some embodiments, the apparatus 800 also comprises a presentation module, configured to present the second object in association with the detection frame in the video.

Figure 9:
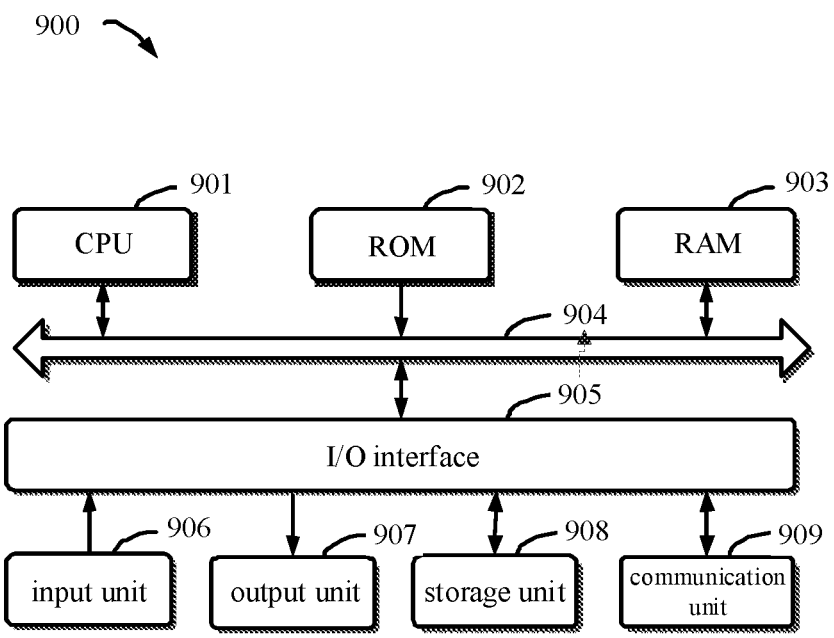
FIG. 9 is a block diagram illustrating a computing device for implementing embodiments of the present disclosure.

FIG. 9 is a schematic diagram illustrating an exemplary device 900 for implementing embodiments of the present disclosure. The device 900 may be configured to implement the computing device 102 illustrated in FIG. 1. As illustrated in FIG. 9, the device 900 includes a center processing unit (CPU) 901, capable of executing various appropriate operations and processes according to computer program instructions stored in a read only memory (ROM) 902 or computer program instructions loaded to a random access memory (RAM) 903 from a storage unit 908. In the RAM 903, various programs and date necessary for the operations of the device 900 may also be stored. The CPU 901, the ROM 902, and the RAM 903 may be connected to each other via a bus 904. An input/output (I/O) interface 905 is also connected to the bus 904.

A plurality of components in the device 900 are connected to the I/O interface 905, including: an input unit 906 such as a keyboard, a mouse; an output unit 907 such as various kinds of displays, speakers; a storage unit 908 such as a magnetic disk, an optical disk; and a communication unit 909, such as a network card, a modem, a wireless communication transceiver. The communication unit 909 allows the device 900 to exchange information/data with other devices over a computer network such as the Internet and/or various telecommunication networks.

The processing unit 901 executes the above-mentioned methods and processes, such as any of the processes 200, 300, and 400. For example, in some embodiments, any of the processes 200, 300, and 400 may be implemented as a computer software program, which may be tangibly contained in a machine readable medium, such as the storage unit 908. In some embodiments, a part or all of the computer programs may be loaded and/or installed on the device 900 through the ROM 902 and/or the communication unit 909. When the computer programs are loaded to the RAM 903 and are executed by the CPU 901, one or more steps in any of the processes 200, 300, and 400 described above may be executed. Alternatively, in other embodiments, the CPU 901 may be configured to execute any of the processes 200, 300, and 400 in other appropriate manners (such as, by means of firmware).

The functions described above may at least partially be executed by one or more hardware logic components. For example, but not being limitative, exemplary types of hardware logic components that may be used include: a field programmable gate array (FPGA), an application specific integrated circuit (ASIC), an application specific standard product (ASSP), a system on chip (SOC), a complex programmable logic device (CPLD) or the like.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate embodiments may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for determining an object, comprising:
   determining a reference representation based on positions of a first reference point and a second reference point of a first object in a reference image, the reference representation indicating a distance and a relative direction between the first reference point and the second reference point in the reference image;
   determining a detection representation based on positions of the first reference point and the second reference point in a detection frame including the first object in a video, the detection representation indicating a distance and a relative direction between the first reference point and the second reference point in the detection frame;
   determining rotation parameters associated with a first predetermined point and a second predetermined point in a second object based on the reference representation and the detection representation, the second object being a three-dimensional object associated with the first object, the first predetermined point being corresponding to the first reference point, and the second predetermined point being corresponding to the second reference point; and
   adjusting a target representation between the first predetermined point and the second predetermined point in the second object based on the rotation parameters.

2. The method of claim 1, wherein, determining the reference representation comprises:
   determining the distance and the relative direction between the first reference point and the second reference point in the reference image based on the positions of the first reference point and the second reference point in the reference image, as the reference representation.

3. The method of claim 1, wherein, determining the detection representation comprises:

selecting a frame including the first object in the video as the detection frame; and determining the distance and the relative direction between the first reference point and the second reference point in the detection frame based on the positions of the first reference point and the second reference point in the detection frame, as the detection representation.

4. The method of claim 1, wherein, determining the rotation parameters comprises:

determining a first angle and a second angle based on the reference representation, the detection representation and a predefined direction, the first angle indicating an angle between a line for connecting the first reference point with the second reference point and an image plane associated with the detection frame, and the second angle indicating an angle between a projection of the connecting line on the image plane and the predefined direction.

5. The method of claim 4, wherein, determining the first angle comprises:

determining a reference distance between the first reference point and the second reference point based on the reference representation;

determining a detection distance between the first reference point and the second reference point based on the detection representation; and determining the first angle based on a ratio of the reference distance to the detection distance.

6. The method of claim 4, wherein, determining the second angle comprises:

determining the relative direction between the first reference point and the second reference point based on the detection representation; and determining the second angle based on the relative direction and the predefined direction.

7. The method of claim 1, wherein, adjusting the target representation comprises:

determining the target representation between the first predefined point and the second predetermined point, the target representation indicating a distance and an relative direction between the first predefined point and the second predefined point;

obtaining a first angle and a second angle based on the rotation parameters, the first angle indicating an angle between a line for connecting the first reference point with the second reference point and an image plane associated with the detection frame, and the second angle indicating an angle between a projection of the connecting line on the image plane and a predefined direction; and adjusting the target representation by utilizing the first angle and the second angle.

8. The method of claim 1, further comprising:

providing guiding information to the first object for guiding the first object to perform a predefined behavior; and obtaining an image including the first object as the reference image in responding to the first object performing the predefined behavior.

9. The method of claim 1, further comprising:

presenting the second object in association with the detection frame in the video.

10. A device, comprising:

one or more processors, and a storage device, configured to store one or more programs, wherein, when the one or more programs are executed by the one or more processors, the one or more processors are configured:

to determine a reference representation based on positions of a first reference point and a second reference point of a first object in a reference image, the reference representation indicating a distance and a relative direction between the first reference point and the second reference point in the reference image;

to determine a detection representation based on positions of a first reference point and a second reference point in a detection frame including the first object in a video, the detection representation indicating a distance and a relative direction between the first reference point and the second reference point in the detection frame;

to determine rotation parameters associated with a first predetermined point and a second predetermined point in a second object based on the reference representation and the detection representation, the second object being a three-dimensional object associated with the first object, the first predetermined point being corresponding to the first reference point, and the second predetermined point being corresponding to the second reference point; and to adjust a target representation between the first predetermined point and the second predetermined point in the second object based on the rotation parameters.

11. The device of claim 10, wherein, when the one or more processors are configured to determine the reference representation, the one or more processors are configured:

to determine the distance and the relative direction between the first reference point and the second reference point in the reference image based on the positions of the first reference point and the second reference point of the first object in the reference image, as the reference representation.

12. The device of claim 10, wherein, when the one or more processors are configured to determine the detection representation, the one or more processors are configured:

to select a frame including the first object in the video as the detection frame; and to determine the distance and the relative direction between the first reference point and the second reference point in the detection frame based on the positions of the first reference point and the second reference point in the detection frame, as the detection representation.

13. The device of claim 10, wherein, when the one or more processors are configured to determine the rotation parameters, the one or more processors are configured:

to determine a first angle and a second angle based on the reference representation, the detection representation and a predefined direction, the first angle indicating an angle between a line for connecting the first reference point with the second reference point and an image plane associated with the detection frame, and the second angle indicating an angle between a projection of the connecting line on the image plane and the predefined direction.

14. The device of claim 13, wherein, when the one or more processors are configured to determine the first angle, the one or more processors are configured:

to determine a reference distance between the first reference point and the second reference point based on the reference representation;

to determine a detection distance between the first reference point and the second reference point based on the detection representation; and to determine the first angle based on a ratio of the reference distance to the detection distance.

15. The device of claim 13, wherein, when the one or more processors are configured to determine the second angle, the one or more processors are configured:

to determine the relative direction between the first reference point and the second reference point based on the detection representation; and to determine the second angle based on the relative direction and the predefined direction.

16. The device of claim 10, wherein, when the one or more processors are configured to adjust the target representation, the one or more processors are configured:

to determine the target representation between the first predefined point and the second predetermined point, the target representation indicating a distance and an relative direction between the first predefined point and the second predefined point;

to obtain a first angle and a second angle based on the rotation parameters, the first angle indicating an angle between a line for connecting the first reference point with the second reference point and an image plane associated with the detection frame, and the second angle indicating an angle between a projection of the connecting line on the image plane and a predefined direction; and to adjust the target representation by utilizing the first angle and the second angle.

17. The device of claim 10, wherein the one or more processors are further configured:

to provide guiding information to the first object for guiding the first object to perform a predefined behavior; and to obtain an image including the first object as the reference image in responding to the first object performing the predefined behavior.

18. The device of claim 10, wherein the one or more processors are further configured:

to present the second object in association with the detection frame in the video.

19. A non-transitory computer readable storage medium having a computer program stored thereon, wherein, when the program is executed by a processor, the program implements a method for determining an object, comprising:

determining a reference representation based on positions of a first reference point and a second reference point of a first object in a reference image, the reference representation indicating a distance and a relative direction between the first reference point and the second reference point in the reference image;

determining a detection representation based on positions of the first reference point and the second reference point in a detection frame including the first object in a video, the detection representation indicating a distance and a relative direction between the first reference point and the second reference point in the detection frame;

determining rotation parameters associated with a first predetermined point and a second predetermined point in a second object based on the reference representation and the detection representation, the second object being a three-dimensional object associated with the first object, the first predetermined point being corresponding to the first reference point, and the second predetermined point being corresponding to the second reference point; and adjusting a target representation between the first predetermined point and the second predetermined point in the second object based on the rotation parameters.

* * * * *